United States Patent [19]

Gallizia

[11] 4,139,592

[45] Feb. 13, 1979

[54] PROCESS FOR INJECTION MOLDING A VEHICLE TIRE TREAD

[75] Inventor: Achille Gallizia, Milan, Italy

[73] Assignee: Industrie Pirelli, S.p.A., Milan, Italy

[21] Appl. No.: 768,872

[22] Filed: Feb. 15, 1977

[30] Foreign Application Priority Data

Mar. 2, 1976 [IT] Italy ............................... 20746 A/76

[51] Int. Cl.² .......................... B29D 3/02; B29H 3/08
[52] U.S. Cl. ..................................... 264/279; 264/36;
 264/328
[58] Field of Search ................. 264/36, 260, 279, 315,
 264/326, 328, 329; 156/125

[56] References Cited

U.S. PATENT DOCUMENTS

| | | | |
|---|---|---|---|
| 2,476,884 | 7/1949 | Maynard | 264/326 X |
| 2,569,935 | 10/1951 | Leguillon | 264/328 X |
| 2,744,290 | 5/1956 | Corson | 264/326 X |
| 2,873,790 | 2/1959 | Cadwell | 264/328 X |

FOREIGN PATENT DOCUMENTS 2058109 11/1971 Fed. Rep. of Germany ........... 264/315
1165586 10/1969 United Kingdom.

Primary Examiner—Jan H. Silbaugh
Attorney, Agent, or Firm—Stevens, Davis, Miller & Mosher

[57] ABSTRACT

A process is provided for molding a tread on a vehicle tire body in which a tire body requiring a tread is supported in a mold which combines with the surface of the tire body to form a cavity conforming to the configuration and dimensions of the tread. The cavity is filled with a flowable vulcanizable elastomeric composition by injection at equally spaced points around the equatorial axis of the mold of measured volumes of material which will combine to fill the cavity and develop a low pressure in the mold cavity to insure flow of material until the cavity is completely filled. The invention also provides an injection molding apparatus having a mold which combines with a tire body supported therein to form a cavity corresponding to the configuration and dimensions of a tire tread. A series of equally spaced openings are provided around the equatorial axis of the mold for injection of molding composition and openings are provided around the sides of the mold cavity for the escape of air from the cavity as it is filled with composition.

5 Claims, 5 Drawing Figures

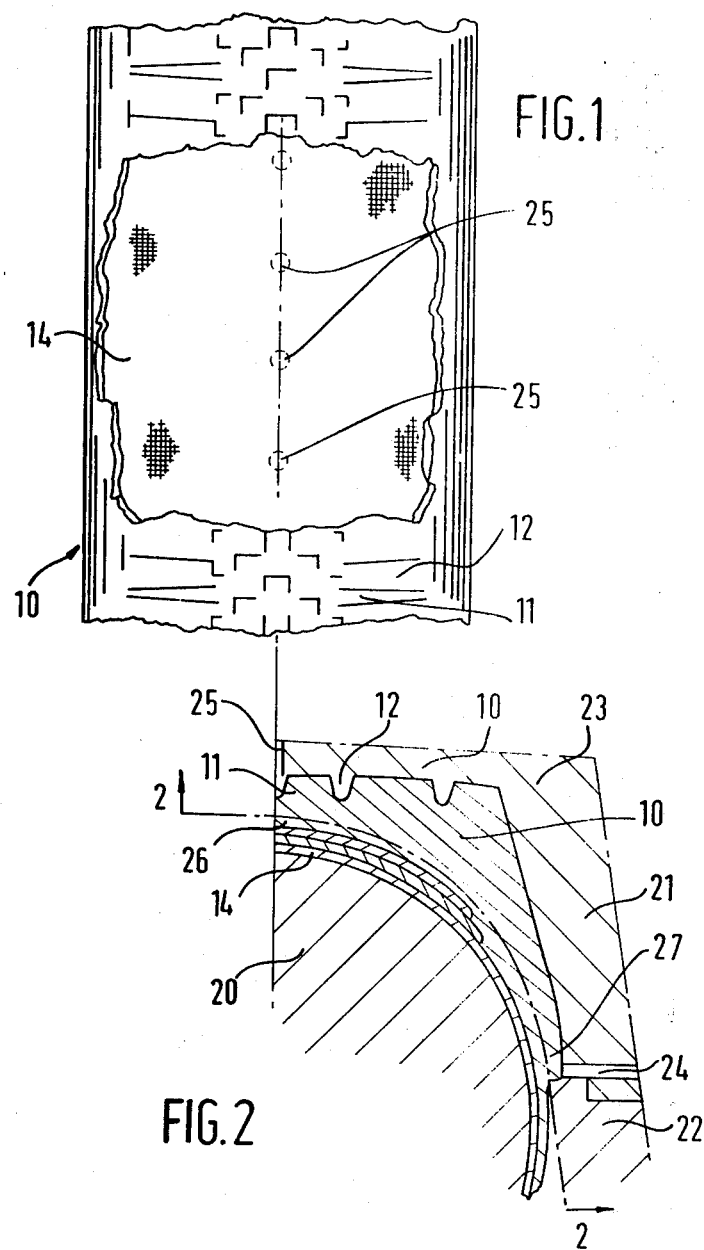

PROCESS FOR INJECTION MOLDING A VEHICLE TIRE TREAD

The present invention relates to a process for the manufacturing of a tread for a motor vehicle tire and more particularly, to the injection molding of a tire tread.

In the manufacture of vehicle tires it is the practice to make the body of the tire first by any of several known processes. The body of the tire is the tire carcass covered by a layer of elastomer composition and may include the walls of the tire and a portion that may be called the "undertread". The tire body also includes the tread reinforcing or breaker structure which is usually made of a textile material. The tire tread is formed on the tire body in a subsequent step. The tire tread is often made from an elastomeric composition which is different from that used for making the sidewalls. The tread is usually provided with ribs and grooves which vary in design from tire to tire. The tread may be formed on the tire body by any of various processes. The present invention provides an improved method for making the tread by injection molding, a technique which has been proposed as theoretically possible, but which so far has not been used commercially because of the difficulties encountered with the proposed process. A tread molding process should not only be applicable to the manufacture of new tires but also to retreading used tires. When a tread is formed on the carcass of a new tire, the components of the tire are "fresh" and the rubber compound which impregnates and covers the textile breaker on the surface facing the tread is in a crude state or only partially vulcanized. On the other hand, when a used tire has to be provided with a retread, the portions of the old tire which remain after the tread has been removed to expose the breaker structure have been vulcanized so the new tread is placed on vulcanized compositions instead of crude material. Hence, the retreading of an old tire involves somewhat different problems from those when molding a tread on a new tire.

It is an object of this invention to provide a process for injection molding a tire tread which is applicable to the manufacture of a new tire and the retreading of an old one. A more specific object of the invention is to provide a process for forming a tire by injection molding an elastomeric composition on a tire body which produces a substantially uniform tread over the tire body surface.

Other objects of the invention will become apparent from the following description with reference to the accompanying drawing wherein FIG. 1 shows schematically a view of a tire tread injected according to the invention, with parts taken away for showing the undertread, i.e., the tire body surface before the injection;

FIG. 2 shows a section through one-half of the injection molded tire of FIG. 1 inside the mold;

Figure 3:
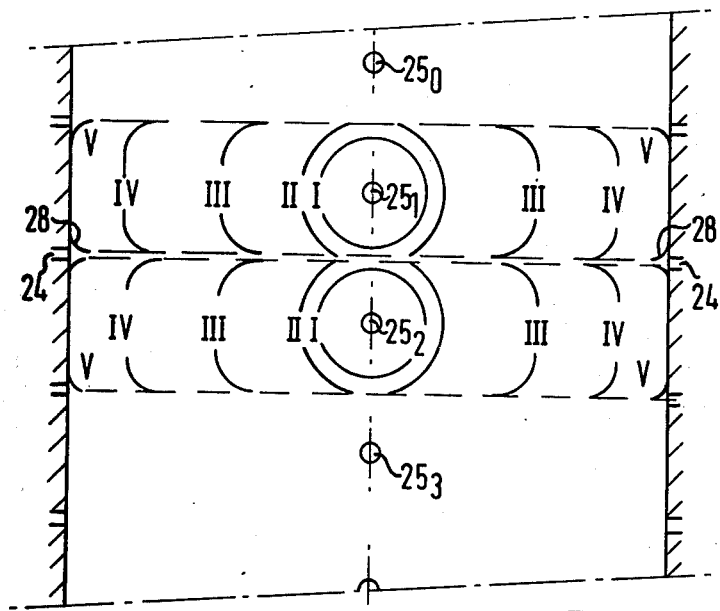
FIG. 3 shows schematically, on an enlarged scale, a section of the structure shown in FIG. 2, taken along the sector of circle 2—2 of FIG. 2, rectified and developed on a sheet plane by the introduction of schematic curves showing the advancement of the elastomer composition in the mold.

Since the invention can be practiced for molding a tread of any tire body and the manufacture of the tire body and breaker structure are not parts of this invention, the description of the invention is devoted only with the manufacture of the tread with the understanding that the portion of the tire on which the tread is applied is to be manufactured by any of the known processes and that the invention can be practiced with a new tire body or an old one from which the tread has been removed.

A process for injection molding a tire tread is described in French Pat. No. 1,508,135. In one of the disclosed processes, a tire body is first manufactured by injection molding an elastomeric compound around a tire carcass to form the sidewalls and an undertread. A mold core or male core member is inserted in the carcass while the sidewalls and undertread are molded. The resulting tire body together with the core member are introduced into an external or female mold member to form a cavity of the desired tread shape and the tread is formed on the tire body by injection molding. The elastomer composition used to form the tread is injected into the mold cavity through a single inlet opening. The injected compound flows in two opposite directions from the opening to fill the mold cavity.

In injection molding techniques it is customary to employ an injection pressure which is sufficiently high to insure that the mold is completely filled. The tendency is to produce mono-directional or at most bidirectional streams in order to avoid weld lines where elastomeric compounds flowing from opposite directions meet and to avoid the formation of pockets or areas which are not filled with elastomer composition. Experience has shown, however, that a tire tread cannot be formed satisfactory with the prior art injection processes. The tire tread structure should be absolutely uniform, geometrically and in physical characteristics. It must be free of sutures, of weak points, of variation in physical properties of whatever nature and, further, the molding step should be such that no damages are caused to the textile structure onto which the fluid rubber compound is injected. The extremely high viscosity of the rubber compound gives rise to heat development by internal friction, due to reciprocal creeping of surfaces and compound fluid flows. This results in non-uniform temperatures which cause variations in physical properties. Consequently, the injection molded tread does not have the expected uniform mechanical properties.

Experience has also taught that, if one tries to overcome these drawbacks and to solve the tread injection molding problems by using extremely high molding pressures as the prior art processes suggest, many technical problems are encountered. The high pressure process is ineffective and uneconomical. Also, the reinforcing structure is damaged with a deleterious effect on the performance of the tire.

The foregoing objects are accomplished and the various disadvantages of the prior art processes for injection molding a tread on a tire body, new or used, are avoided in accordance with this invention by providing a process wherein (1) an elastomeric composition is injected into a mold cavity having the shape required to form the desired tread design through a plurality of injection openings disposed on the equatorial plane of the mold;

(2) the openings are arranged and spaced from each other so that the spreading injected compound introduced through one of the openings meets that flowing from an adjacent opening before they flow in opposite directions from the mold equatorial plane, the compound from one opening thus opposing the flow of the other compound along the equatorial plane and giving rise to a localized pressure area at the meeting point of the oppositely flowing streams of compound;

(3) the flow of compound into the mold cavity is maintained that the compound passing through each injection opening has a tendency to flow in two opposite transversal directions with respect to the tire along the transversal planes passing through the injection openings, and gives rise to a steadily increasing contacting surface between the oppositely flowing streams in correspondence of the intermediate transversal planes between two adjacent openings, the total advance of compound in a transverse direction to the tire in this area between adjacent openings being due to the interaction of the two oppositely flowing streams coming from adjacent nozzles;

(4) the compound reaches the side limits of the tread, first in coincidence with the transversal planes passing through the injection openings and thereafter in more distant areas, progressively, from the said planes until, due to the action of oppositely flowing streams coming from adjacent nozzles, it reaches the tread side limit, also in the transversal intermediate planes between adjacent nozzles;

(5) the amount of compound injected into the mold cavity is dosed in a manner whereby injection is continued after the mold cavity is filled until a relatively low pressure of some tens of atmospheres is developed.

Preferably, evacuation or free outlet means are provided for the air in the last areas filled by compound on transversal planes which are intermediate adjacent injection openings. The streams of compounds move the air towards these openings as the cavity is filled.

It has been found that, for performing the above-described process, a mold should be provided in which the injection openings are not only symmetrically arranged at regular intervals along the equatorial plane of the mold, but also arranged and spaced in such a manner that the ratio between the distance between the facing edges of two adjacent openings as measured along the diametrical plane of the mold, and the tread width as measured transversally perpendicularly to the diametrical plane of the mold is not higher than ½ to 1/10, preferably within the range of ¼ and 1/7.

It is therefore a further object of the present invention to provide an apparatus for injection molding a tire tread which is adapted to inject dosed quantities of an elastomeric composition in a mold cavity which will produce a limited pressure at the end of the molding step in combination with a mold provided with injection openings which are positioned as hereinbefore stated. This apparatus is combined with a device which supplies the elastomeric composition at the desired viscosity at the desired temperature.

Further features and advantages of the present invention will become apparent from the description of a preferred embodiment of the invention with reference to the attached drawings.

Referring to FIG. 1, 10 indicates generally a tire tread provided with ribs 11 and grooves 12 which may be of any design pattern. The illustrated pattern is merely a typical one because the tread can be of any desired pattern.

It should be observed that for performing the invention, the ratio between the total volume of the actual tread and the volume it would have if grooves 12 did not exist and the tread thus had the same thickness as ribs 11 at every point should preferably be between 60 and 90%.

In FIG. 1 textile reinforcement member 14 is shown, which can be of any kind, as, for instance, a part of a radial carcass or of an annular breaker, according to the known tire structures. In fact, as pointed out above the present invention is applicable to the manufacture of a new tire or to the retreading of a used tire regardless of the particular type of tire being manufactured or retreaded.

As can be seen in FIG. 2, the mold generally includes a male or core member 20 whose function is to support the tire body. For the purposes of the present invention, it is insignificant whether the core 20 was used for performing the tire body by injection molding or manufacture or any other manner or whether it is only a support which is introduced into an already prepared tire body. The mold also includes a female member generally indicated as 21 which can be made up of any number of parts. In this case, it has two sides parts 22—22' and two annular peripheral parts 23—23' between which holes 25 for injection of compound and openings 24—24' for air evacuation or free vent from the mold are bored.

The equipment required for making the compound for converting it into an injectable fluid, for bringing it under pressure for conveying it into the mold and for all of the auxiliary steps, is not shown because any conventional equipment can be used and such equipment is not part of the present invention.

As can be seen from FIG. 1, the moldable elastomeric compound is conveyed into the mold through the openings 25. The injected portion thereof, i.e., tread 10, is shown above broken line 2—2 in FIG. 2 and under it an undertread 26 can be seen, which connects to sidewalls 27—27' with which it forms the body of the tire which, too, can be of any known structure.

In FIG. 3 some injection openings are shown diagrammatically in a limited arc of the annular crown of the mold. The illustrated injection openings are round in cross-section, for this is their most natural shape, but they could be of any other desired shape such as square or the like provided the conditions as set by the present invention are respected.

Referring now to FIG. 3, two adjacent openings $25_1$ and $25_2$ are shown. At the beginning of the injection step, compound will flow out through both openings in a substantially uniform manner in all directions, and initially it will therefore set into a circle configuration. At the beginning, the flow of the compound is free and the two streams of compound from openings $25_1$ and $25_2$ do not interfere with each other, wherefore the two circles indicated with (I) are obtained. These circular streams are spaced and represent the edge of the area occupied by the compound a short time after injection has begun.

As injection continues, areas occupied by the compound delimited by the circles widen and at a certain subsequent moment the situation shall be the one shown by both circles (II)—(II), which are tangent to each other.

Up to this point compound flow has taken place undisturbed through each orifice $25_1$ and $25_2$, as if the other one did not exist. However, as the injection progresses and while the compound can flow freely from both orifices in a transversal direction to the tire, in the equatorial direction and in the intermediate directions between the latter direction and the transversal one, the progress of the compound is no longer free because the streams of compound come into contact with each other. As the streams tend to advance in opposite directions, they give rise at their contacting surfaces to a certain pressure and the latter gives rise to rolling movements of both streams of compound on each other with a mixing thereof. It is difficult to exactly define such a phenomena but it can be said to be inevitably accompanied by an enlargment of the contact area between the streams of compound in their transversal direction and, therefore, by an increase in pressure area due to the contact of the two superposed streams of compound. After a further time period, there will be therefore two terminal curves of area occupied by the compound, indicated with (III)—(III) which do not have a circular form but are roughly elliptical in shape. This phenomenon increases as time goes by and the areas occupied by the compound tend to widen steadily in a transverse direction without extending into the equatorial direction, giving rise, successively to the limit curves indicated with (IV)—(IV) and (V)—(V). When this last stage is attained, the streams of compound come in contact with the mold walls, i.e., the compound has reached the side limits of the tread width in the transversal planes going through the axes of the injection opening.

As can be understood from the above description of the movement of compound in the mold cavity, the air contained in the mold is swept towards the side with no possibility of air pockets, and when the compound has reached the limit of curves (V)—(V) only the small pockets 28—28' remain. Orifices 24—24' can be provided at points where pockets will remain for evacuation or free outlet of the air. The small pockets 28—28' will be filled by injected compound which has been dosed volumetrically so that a slight pressure increase occurs. For instance, a pressure of up to 20–30 atmospheres may be developed in the mold cavity. Larger pressures in the range normally used in known injection processes are not required.

What has been said about the orifices $25_1$–$25_2$ applies, of course, for any pair of adjacent injection orifices, and thus the compound coming through orifice $25_1$ interacts with that coming through orifice $25_0$, and the one coming through orifice $25_2$ interacts with the one coming through orifice $25_3$.

Figure 4:
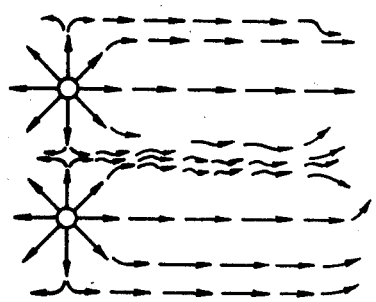
FIG. 4 shows schematically composition flow lines as seen from the same point as in FIG. 3.

FIG. 4 illustrates the possible flow lines along various directions of compound coming through the orifices, based on the phenomenon illustrated in FIG. 3. Of course, it is not intended to imply that the flow lines will follow exactly the drawn pattern. The purpose of FIG. 4 is only to further illustrate under a general and qualitative point of view the present invention.

Figure 5:
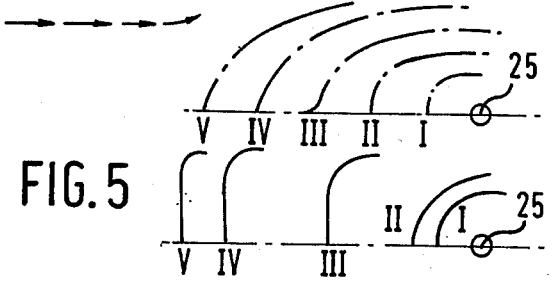
FIG. 5 is a qualitatively diagrammatic illustration of pressure corresponding to the schematic flow lines of FIG. 4.

Similarly, FIG. 5 should be understood as a merely illustrative and qualitative one, indicating how the pressure varies with progress of time in the various points of injection space involved by an injection opening.

In other words, FIG. 4 and FIG. 5 show in a very schematic way what is supposed, in principle, to occur in behavior of the flowable material introduced into the mold through adjacent openings in successive time fractions of the material distribution process. These successive time fractions are visualized in a first approximation by the sets of small arrows which re-produce flowable compound distribution in only a symmetric mold half. The diagram of FIG. 4 is in particular shown for visually suggesting the inter-diffusion phenomena which occurs between compound fractions entering adjacent openings and their progress towards the mold edges.

FIG. 5 (whose lower part reproduces only one of four diagram quadrants of any of the openings 25 of FIG. 3) represents in a first approximation increments of both pressure and resistances met by compound, due to its contact with compound coming out from an adjacent opening. It should be noted that this pressure (qualitatively but not quantitatively detectable on the ordinate) progressively attains its maximum value upon the filling of the space with compound and becomes substantially nil (obviously in its values applied for the injection) after the space is completely filled because the injection is quantitatively dosed.

Of course, after the injection step is completed, conventional vulcanization steps are to be carried out. This shall be performed conveniently while the tire is still in the injection mold, so that it can be taken out of the mold in its vulcanized condition and therefore of complete mechanical resistance. Tires having the thus produced treads have shown to be perfectly uniform and to have high mechanical features.

This high quality of tread is both unexpected and surprising. First of all, one would have supposed that the multiplication of injection openings, which is necessary in accordance with the invention would have an undesirable effect as it multiplies the number of weld lines between the various injection streams and goes, therefore, in a direction opposite to technical prejudice, which wants the injection to take place in such a manner that a monolithic body is obtained. It is also surprising that high final pressures are not required because such high pressures had been considered necessary for obtaining complete filling of all of the mold areas. Moreover, weld areas formed between different streams of injected compound become homogeneous.

Secondly, if somebody had thought he might advantageously carry out the injection through a great number of injection orifices, he would have also thought of assigning to each one of the orifices an approximately square influence area, i.e., to blind areas between orifices, a length approximately equal to the tread width and not much smaller, as provided for, on the contrary, by the present invention. It is certainly surprising that an injection process in which the various streams instead of advancing in the possibly free and natural manner, are from the beginning forces to deform and to interact with each other and to determine limit surfaces of areas occupied by compound coming from the various orifices which have a configuration so markedly asymmetric, that there is a positive effect on the characteristics of the product thus obtained.

The applicant can only suggest the hypothesis, which obviously he does not intend to blind himself to, that the unexpected result of the invention is due to phenomena occurring within the area of contact of the streams of compound flowing in opposite directions due to mixing, rolling and in the general complex trajectories imposed on the various streams by the action of opposite thrusts.

The illustrated embodiment example involves the use of circular injection openings but it is obviously possible to make use of different orifice shapes, and thus square orifices or other asymmetrical ones differing in dimensions may be used provided the conditions previously defined according to the characteristics of the present invention are respected.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the manufacture of a motor vehicle tire by injection molding of a elastomeric compound in a composite mold having a mold cavity which corresponds 3-dimensionally to the geometry of the tire tread, said tread and said cavity having the same equatorial plane which is orthogonal to the axis of the tire, said compound being injected into said mold in dosed quantities through a plurality of openings distributed along said equatorial plane, spaced from each other by a distance which is smaller than the linear development of said cavity in the radial planes containing said axis, whereby the compound flows, which initially distribute freely in every direction starting from each individual opening, when they subsequently meet — in directions parallel to said equatorial plane, the flows coming from the adjacent openings, progress their distribution in parallel directions to said radial planes until completely filling the said cavity, the improvement wherein said injection of compound is spaced at intervals within the range of from 1 to 2 and 1 to 10 of the tread width in its radial planes.

2. Process as in claim 1, wherein said injection of compound is spaced at intervals within the range of 1 to 4 and 1 to 7 of the tread width in its radial planes.

3. Process as in claim 1, wherein during said injection of compound, the air inside the cavity of the mold escapes through a plurality of passages positioned in coincidence with the areas of said cavity reached last by the compound as it is injected through adjacent openings.

4. Process as in claim 3, wherein the air inside the cavity of the mold escapes through a plurality of passages positioned in coincidence with the mold side edges and in radial bisector with respect to planes containing the individual injection opening, substantially equal doses of compound being at the same time, injected through said openings.

5. Process as in claim 1, wherein when the mold cavity is filled, a relatively low pressure is applied, on the order of ten atmospheres.

* * * * *